Nov. 23, 1943.     C. R. GRAVES ET AL     2,335,055
FLOAT CONTROLLED SWITCH
Filed June 9, 1942
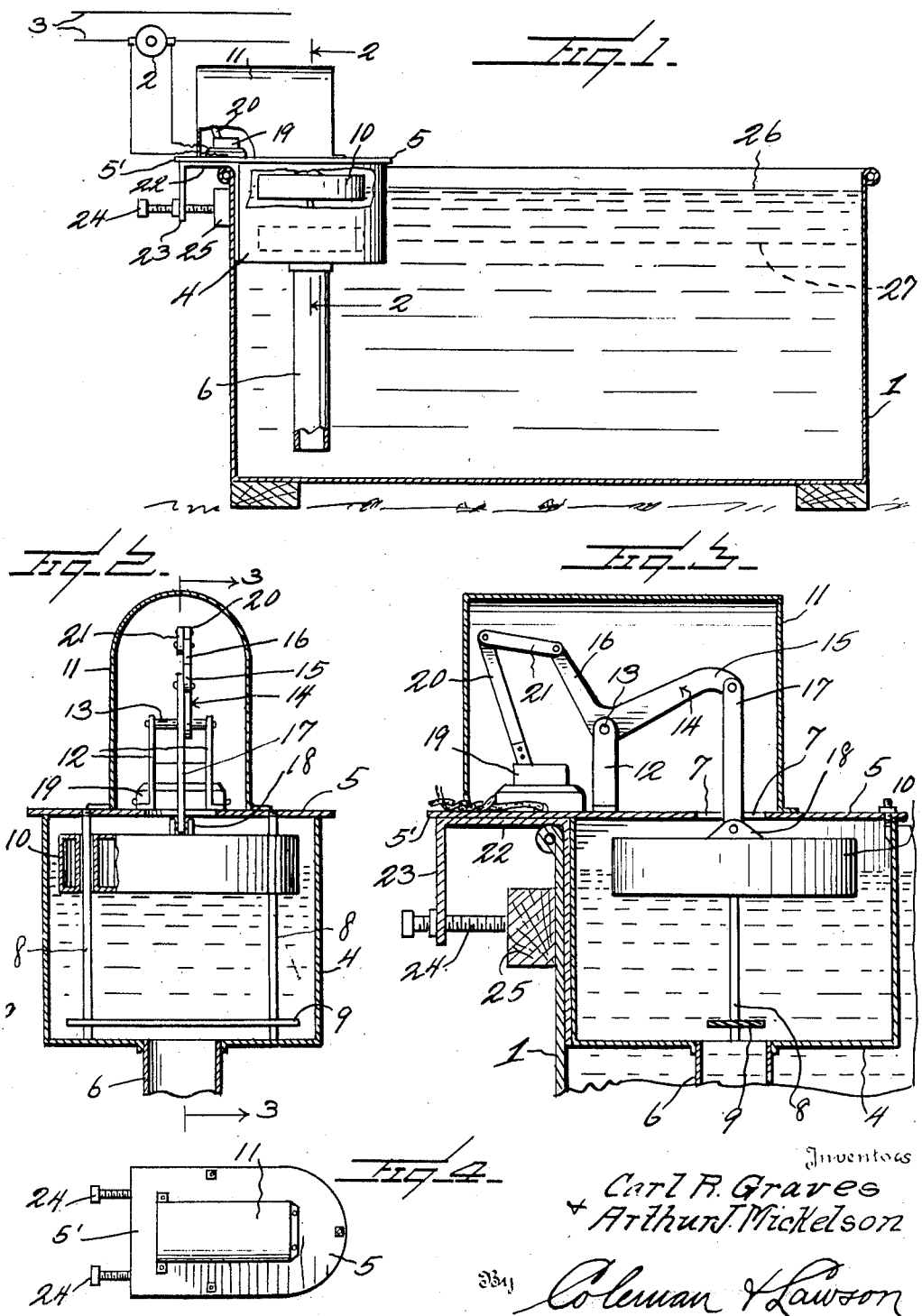

Patented Nov. 23, 1943

2,335,055

UNITED STATES PATENT OFFICE 2,335,055

FLOAT CONTROLLED SWITCH

Carl R. Graves and Arthur J. Mickelson,
Clarion, Iowa

Application June 9, 1942, Serial No. 446,380

1 Claim. (Cl. 200—84)

This invention relates broadly to mechanism for controlling the water supply for a tank or similar receptacle, and pertains more particularly to an improved automatically operated electric switch mechanism by which the turning on and off of an electrically operated pump is effected as desired with the rise and fall of the water level in such tank.

In the operation of fluid tanks or receptacles from which the fluid is continuously or intermittently removed and where it is desirable that continuous replacement be made to maintain an approximate predetermined level, the use of some automatically operated means which will respond to variations in the level of the liquid and function to effect the addition of more liquid to the receptacle or cut off the inflow of the liquid, is highly desirable and this is particularly true of farm watering tanks from which stock is watered. It is also desirable, in connection with the use of stock watering tanks or troughs that such mechanism be of a relatively simple and inexpensive construction and at the same time be sufficiently sturdy and reliable to withstand the usage to which such equipment would necessarily be subjected in the situation stated.

In view of the foregoing it is the principal object of the present invention to provide a float actuated switch controlling unit for effecting the starting or stopping of a motor operated pump, which can be readily attached to any watering trough or tank without requiring special equipment or any particular formation or construction of a specified part of the tank and which will function efficiently when the water in the tank reaches a predetermined level to close the switch for the starting of a motor pump connected therewith, or to shut off such pump by the opening of the switch when the float rises to a predetermined level with the water level.

Another object of the invention is to provide a device of the character stated, which is entirely enclosed and which is designed in a novel manner to permit the water to rise and fall under the switch operating float, while at the same time preventing the entrance of scum or other floating matter, into the area occupied by the float.

Still another object of the invention is to provide in a mechanism of the character stated, a novel linkage between a float and a toggle switch by means of which the actuation of the toggle switch between on and off positions is accomplished easily by a float of minimum size as the float reaches the limits of its raised and lowered positions.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a vertical sectional view through a water tank showing the device of the present invention applied thereto, parts of the device being broken away.

Figure 2 is a vertical section on the line 2—2 of Figure 1.

Figure 3 is a vertical section on the line 3—3 of Figure 2.

Figure 4 is a view in top plan of the float controlled switch, on a reduced scale.

Referring now more particularly to the drawing the numeral 1 generally designates a water tank such as might be used upon a farm for watering stock, while the numeral 2 designates a hand controlled switch located in one side of a power line 3 for controlling the flow of electric current to a motor operated pump, not shown, which functions to supply water to the tank 1.

The float actuated switch unit of the present invention comprises a float housing 4 formed of any suitable material and of any desired shape, and having a removable top or cover 5 which is of a size to have a portion extend or project beyond a side of the housing 4, thereby providing the overhang or extension 5'. The bottom of the housing 4 has secured thereto and opening therethrough the downwardly extending pipe 6 through which water is admitted to the housing.

The removable top 5 of the float housing is provided with an opening 7 which is aligned with the water tube or pipe 6 and upon opposite sides of this opening are secured to the top 5 the depending float guide rods 8 which are connected together at their lower ends by a spacer plate or bar 9. These guide rods 8 pass through suitable openings or passageways formed in a float body 10 which moves vertically in the housing on the rods.

Removably mounted upon the top 5 of the float housing is a cover housing 11 which is relatively long an narrow, as shown, and which covers the opening 7 and extends over the extended or overhanging portion 5' of the housing top. Within this cover 11 there is mounted upon the housing top 5 a pair of vertically disposed spaced parallel standards 12 which together form a frame for the support of a pivot shaft or pin 13.

The pivot shaft or pin 13 extends through and supports a bellcrank, indicated generally by the numeral 14, the pin 13 passing through the crank at the angle or point of connection between the two arms 15 and 16. To the free end of the arm 15 is pivotally attached one end of a connecting rod 17, the other end of this rod being pivotally coupled between suitable spaced ears 18 which are attached to the top of the float 10, thereby operatively coupling the lower end of connecting rod 17 with the float so that as the latter rises and falls in the housing 4, with the rise and fall of the water level in the tank, rocking motion will be given the bellcrank lever upon the pivot 13.

Upon the side of the bearing standards 12 opposite from the float connecting rod, there is mounted upon the top 5, the toggle switch unit which is indicated as a whole by the numeral 19. Such toggle switches are of well-known construction and, therefore, a detailed description and illustration of same are deemed unnecessary. The toggle lever for the switch unit 19 is replaced by a longer lever which is indicated by the numeral 20 and the upper end of this lever is connected by the link 21 with the free end of the arm 16 of the bell crank, as shown.

Secured to the under side of the extended portion 5' of the cover or top 5 and to the adjacent side of the housing 4, is an inverted substantially U-shaped bracket 22 which forms a unit of a clamp by means of which the apparatus as a whole is secured to the top edge of the water tank. The outer leg of this bracket 22, which is indicated by the numeral 23, carries a screw 24 which may be threaded inwardly to engage the wall of the tank when the latter is introduced between the two portions of the clamp bracket 22 in the manner illustrated. If desired, particularly if the tank 1 is of metal, a filler block 25 may be introduced between the inner end of the clamping screw 24 and the wall of the tank for the purpose of increasing the effective thickness of the tank wall and also to protect the metal from puncture in the event that the clamping screw is drawn up too tightly.

When the control device is placed in position the major portion of the float housing will be below the normal high level of water in the tank, which level is indicated at 26, and thus after the water reaches this level it will lift the float 10 to a position where the bellcrank lever will be raised sufficiently to rock the toggle 20 of the switch sufficiently to open the switch. The low water level of the tank, indicated by broken lines 27, will be near the bottom of the float housing and, consequently, when the float is lowered to the bottom of the housing the switch toggle 20 will be swung over to switch-closed position, and thus the motor operated pump will be started to replenish the supply of water in the tank.

By providing the relatively long water pipe 6 extending downwardly from the bottom of the float housing and opening thereinto, it will be seen that water from the tank will rise into the housing from a point near the bottom of the tank, and thus the entrance of scum or floating particles which might be found upon the surface of the tank water cannot enter the float housing. The cover 11 shields the linkage mechanism between the float and the switch as well as the switch 19 and, consequently, all moving parts are thoroughly shielded from the weather.

I claim:

A mechanism of the character stated comprising a housing open at its top, a removable cover for closing said open top, means carried by one side of the housing forming a clamp facilitating the attachment of the housing to a water tank wall for the support of the housing within the tank, a pipe connected with and opening through the bottom of the housing and extending downwardly therefrom to conduct water from the lower part of the tank into the housing, a fixed guide means carried by the removable cover and extending within the housing, a float operatively engaged with the guide means for free movement, an electric switch supported upon the cover for the housing and having an oscillatable member by which the opening and closing of the switch is effected, an upstanding post carried by the cover, a bellcrank pivotally mounted upon the post, a rod pivotally connected with one end portion of the bellcrank and with the float, the cover being provided with an opening for the passage of the rod therethrough, and an operative connection between the opposite extremity of the bellcrank and the oscillatable member of the switch.

CARL R. GRAVES.
ARTHUR J. MICKELSON.